United States Patent [19]

Wood et al.

[11] 3,874,917

[45] Apr. 1, 1975

[54] METHOD OF FORMING VITREOUS SEMICONDUCTORS BY VAPOR DEPOSITING BISMUTH AND SELENIUM

[75] Inventors: Charles Wood, Sycamore, Ill.; John C. Schottmiler, Penfield; Francis W. Ryan, Fairport, both of N.Y.

[73] Assignee: Xerox Corporation, Stamford, Conn.

[22] Filed: June 18, 1973

[21] Appl. No.: 371,096

Related U.S. Application Data

[60] Continuation-in-part of Ser. No. 79,970, Oct. 12, 1970, abandoned, which is a division of Ser. No. 674,267, Oct. 10, 1967, Pat. No. 3,627,573, which is a continuation-in-part of Ser. No. 550,215, May 16, 1966, abandoned.

[52] U.S. Cl. ............. 117/211, 117/106 R, 117/119, 117/124 A, 117/127, 117/138.8 E, 117/201, 117/215, 117/230

[51] Int. Cl. ....................... H05b 33/28, C23c 11/00

[58] Field of Search ........ 117/201, 119, 106 R, 215, 117/106 A, 230, 211, 124 A, 127, 138.8 E

[56] References Cited

UNITED STATES PATENTS

| | | | |
|---|---|---|---|
| 2,938,816 | 5/1960 | Gunther | 117/106 |
| 3,065,112 | 11/1962 | Gilles | 117/106 |
| 3,361,591 | 1/1968 | Dill | 117/106 |
| 3,466,191 | 9/1969 | Stinchfield | 117/213 |
| 3,472,679 | 10/1969 | Ing, Jr. | 117/107 |
| 3,632,439 | 1/1972 | Deklerk | 117/201 |

*Primary Examiner*—Michael F. Esposito
*Attorney, Agent, or Firm*—J. J. Ralabate; J. P. O'Sullivan; J. T. Jeffers

[57] ABSTRACT

This invention relates to a process for preparing a vitreous semiconductor comprising bismuth and selenium. The semiconductor has at least 0.5 atomic percent bismuth and a greater than a stiochiometric percentage of selenium. The invention also relates to a method for producing such a semiconductor by co-evaporating the bismuth and selenium and simultaneously quenching the metal and non-metal vapors onto a substrate held at a temperature below the condensation point of either component.

8 Claims, 1 Drawing Figure

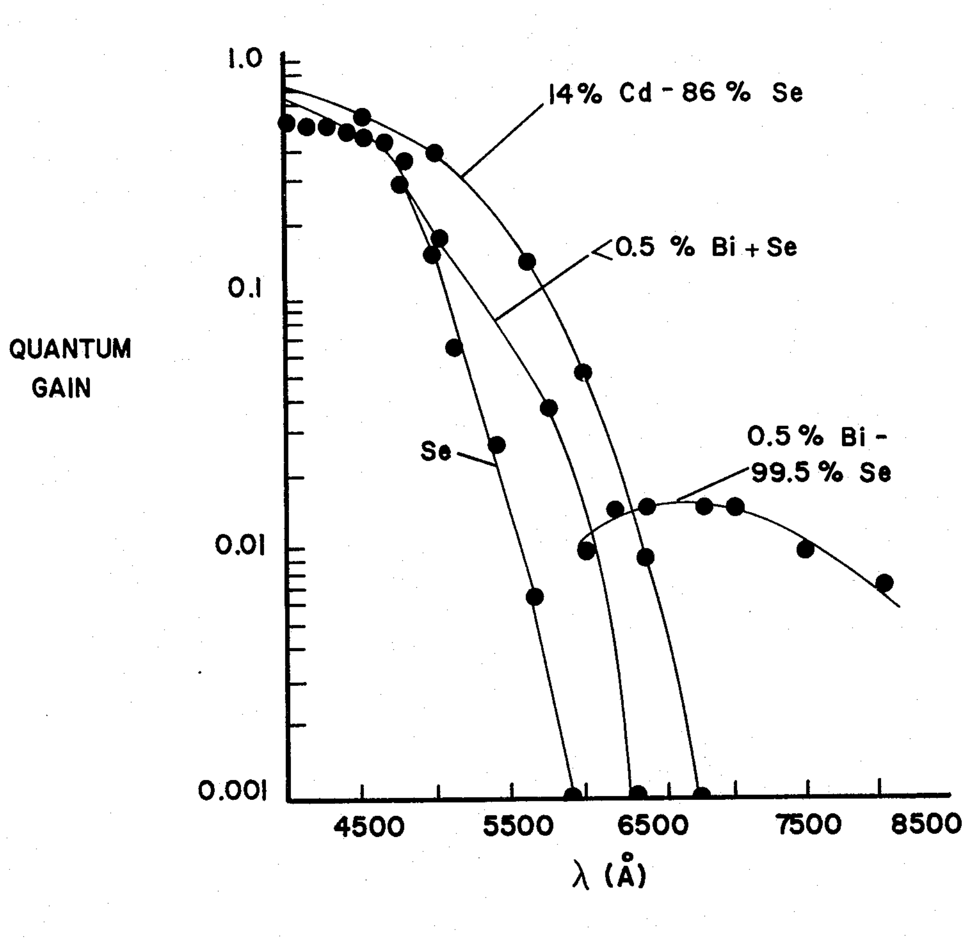
1.0
0.1
0.01
0.001
QUANTUM
GAIN
14% Cd - 86 % Se
0.5 % Bi + Se
0.5 % Bi -
99.5 % Se
Se
4500
5500
6500
7500
8500
λ (Å)

METHOD OF FORMING VITREOUS SEMICONDUCTORS BY VAPOR DEPOSITING BISMUTH AND SELENIUM

BACKGROUND OF THE INVENTION

This application is a continuation-in-part of copending application Ser. No. 79,970 filed Oct. 12, 1970, now abandoned, in the names of Charles Wood, John Schottmiller and Francis Ryan which is a divisional application of application Ser. No. 674,267 filed Oct. 10, 1967 and now U.S. Pat. No. 3,627,573 which in turn is a continuation-in-part of application Ser. No. 550,215 filed May 16, 1966 by said inventors which application is now abandoned.

This invention relates to semiconductors or semi-insulators in general and in particular to a system for preparing new vitreous semiconductors.

Two common semiconductors are highly purified silicon and germanium with slight traces (parts per million or billion) of selected impurities and/or crystal imperfections being present to modify or change the semiconductor properties.

These impurities contain either loosely bound electrons that can move or carry some current or the impurities remove electrons from their normal place in the lattice and so form a "hole" which can be filled by an adjacent electron whose movement creates a new hole which in turn is filled. The resulting movement of the hole is the equivalent of electrical conduction in a direction opposite to that occurring when electrons move. Some of the more important semiconductor materials include silicon, germanium, selenium, cuprous oxide ($Cu_2O$), lead sulfide, silicon carbide, lead telluride, and other compounds. Typical semiconductor applications are for use in rectifiers, modulators, detectors, thermistors, photocells, transistors, and electrical circuits.

As shown above, it can be seen that semiconductors may be made up of single elements or may consist of various compounds exhibiting semiconductive properties.

The preparation of known semiconductors involves, of necessity, carefully controlled processing steps such as special techniques in crystal growth, epitaxial deposition, involved doping techniques, etc. Such highly controlled processes add to the cost of the final product. There is, therefore, an ever present need for new semiconductor materials which yield a wider range of desirable electrical properties and yet may be simply and economically manufactured.

OBJECTS OF THE INVENTION

It is, therefore, an object of this invention to provide a new type of semiconductor which overcomes the above noted disadvantages.

It is another object of this invention to provide an improved process for producing thin layers of materials having desirable electrical properties.

It is a further object of this invention to provide an improved method for producing thin films of materials having improved electrical characteristics.

It is yet another object of this invention to provide a new type of vitreous semiconductor having desirable photoconductive properties.

It is another object of this invention to provide a new type of vitreous semiconductor having enhanced electrical characteristics.

SUMMARY OF THE INVENTION

The foregoing objects and others are accomplished in accordance with the present invention by providing a method of forming new vitreous semiconductors by coevaporating bismuth and selenium onto a substrate held at a temperature below the condensation point of either component. This substrate temperature will normally be substantially lower than either source temperature. By quenching the vapor of the components onto such a substrate, the different atoms are randomly mixed to form a continuous homogeneous non-crystalline film on said substrate, said film having greater than stoichiometric proportions of the non-metal component, i.e. selenium. The present invention is in contrast to U.S. Pat. No. 2,932,599 which discloses a vapor quenching process but holds his substrate at a temperature above the condensation point of the non-metal. This method cannot produce semiconductive materials having a greater than stoichiometric amount of the non-metal. Dill, et al., disclose in U.S. Pat. No. 3,361,591 the vapor deposition of cadmium selenide or cadmium and selenium onto a substrate to form a semi-conductor. However, cadmium/selenium semi-conductors do not possess spectral sensitivity in the infrared and longer wavelength variable spectra regions as do the semi-conductors prepared by the process of the instant invention.

The materials prepared by the process of this invention can best be described as vitreous semiconductors or semi-insulators. These materials possess electrical properties different from the components taken separately, or combined in stoichiometric amounts. X-ray diffraction patterns of these materials are of the so-called vitreous or non-crystalline type. These vitreous semi-conductors may be described as thermodynamically metastable, although they possess a high degree of phenomenological stability and retain their structure at relatively high temperatures. In some instances, the crystallization temperature of these vitreous semiconductors is higher than either component alone.

These films may be formed in any convenient thickness. Although thicknesses of several hundred angstroms may be formed, films ranging from about 1,000A up to 200 microns and higher, are most suitable for semiconductor applications.

The method of the instant invention may be carried out in any apparatus which can provide a vacuum. The apparatus illustrated and described in U.S. Pat. No. 3,627,573 is especially effective. In order to practice the method of the instant invention, the bismuth and selenium are placed in separate inert crucibles such as quartz or tantalum. It is generally desirable to maintain the temperature of the components at between their melting point and boiling points.

The vacuum chamber is maintained at a vacuum of about $2 \times 10^{-5}$ to $2 \times 10^{-8}$ Torr, although vacua above and below this range can also be used satisfactorily. A film thickness of about 5 to 30 microns is obtained when evaporation is continued for a time ranging from about 1 to 3 hours at a vacuum of about $2 \times 10^{-5}$ Torr. It can be seen that the amount of a particular component in the vitreous film is primarily dependent upon the amount of metal or non-metal evaporated which is source temperature dependent. It should be noted that the vitreous film may also be formed under nonvacuum conditions such as by vapor transport or sputtering.

To increase the amount of selenium in the film, the temperature of the selenium container would be increased and/or the temperature of the bismuth container lowered. To increase the amount of bismuth in the film, the above temperature changes would be reversed. Where a very slow rate of evaporation is desired, the evaporation temperature of one or both components may be maintained at a temperature below its melting point.

The vitreous semiconductor films prepared by the process of the present invention may be formed on any suitable substrate whether it is conductive or insulating. Typical conductive substrates are brass, aluminum, stainless steel and conductively coated glass or plastic. Typical insulators are quartz, Pyrex, mica and polyethylene.

Although crystalline compound semiconductors may be capable of small deviations from stoichiometry, the vitreous materials of the present invention can have wide deviations on the side of stoichiometry which has excess non-metal. That is, by properly controlling the respective evaporation rates and by holding the substrate at a temperature below the condensation point of either component, and particularly below the condensation point of the selenium, excess selenium (i.e., more than a stoichiometric amount) is deposited in a thin semiconductive layer. The structure of the materials of this invention are in the glassy rather than the crystalline state. The structure is characterized by the absence of intermediate or long-range order. The X-ray diffraction patterns are of the so-called vitreous or noncrystalline type. These compounds cannot normally be prepared as glasses (cooled from the melt) and there is no report of vitreous materials or glasses ever having been prepared in this system.

With respect to the electrical properties, the vitreous materials prepared by the process of this invention can best be described as semiconductors or semi-insulators, that is, having a valence and conduction band separated by a forbidden energy gap. They possess electronic properties different from those of components taken either alone or combined in a stoichiometric crystalline condition. Although they may be properly described as thermodynamically metastable, they possess a high degree of phenomenological stability and retain their structure well above room temperature. Their crystallization temperature in some instances has been observed to be higher than either component alone.

These vitreous materials may be prepared only by quenching from the vapor phase and not by any of the known melt techniques. In fact, these materials are immiscible in the liquid state to well above the boiling point of one of the components.

Vitreous semiconductive materials having up to the stoichiometric amount of metal can be produced in accordance with the presently disclosed method. The present invention and the products produced thereby should not be confused with doped vitreous layers, such as doped selenium. In doped layers, the dopants are normally present in extremely minute quantities, on the order of parts per million. Such products can be produced in accordance with well-known melt or diffusion techniques. It was not possible, until the present invention, to include substantial but less than stoichiometric amounts of bismuth without crystallizing the selenium. The present invention, however, achieves such incorporation without undesirable crystallization. As this incorporation forms an essential feature of the present invention, a preferred range of materials includes those having a substantial, but less than stoichiometric amount of bismuth. By substantial, it is meant more than doping quantities and at least 0.5 atomic percent bismuth. In general, such materials cannot be produced with prior art techniques because of phase immiscibility at higher concentrations of the metal component. In accordance with the herein-disclosed method, such semiconductive materials can be produced in the amorphous state. The method of the instant invention provides vitreous semiconductors having particular application to the field of xerography. These compositions show photoconductive spectral response in wavelengths from the visible all the way to and including the infrared. Bismuth in combination with selenium forms a vitreous semiconductor capable of receiving an electrostatic charge, and upon exposure to light, forming an electrostatic latent image, which is capable of being developed in the well-known xerographic mode such as that set forth in Carlson U.S. Pat. No. 2,297,691, and other related patents in the xerographic field.

The metal bismuth with selenium is sensitive to infrared radiation and may, therefore, be employed in a xerographic system receiving radiation which is out of the visual spectrum. Small amounts of bismuth, on the order of about 0.5 to 3 atomic percent (approximately 1.2 – 7.5 weight percent) have been shown to have a large effect in increasing the spectral sensitivity in the infrared region. Further amounts of bismuth increase the conductivity of the semiconductive material and make it unsuitable for xerographic purposes which require the retention of a latent electrostatic image on the material surface. However, the higher percentage bismuth/selenium semiconductor can be effectively utilized in systems other than xerographic which do not require retention of such a latent electrostatic image, such systems include infrared photodetection, vidicons, light amplifier panels, electroluminescent and other electro-optical devices. Bismuth/selenium alloys having about 11 to 16 atomic percent (approximately 24 to 34 percent) bismuth have been shown to have the best photodetection response in considering non-xerographic application. Accordingly, the aforementioned percent ranges form preferred ranges for this particular semiconductor system at a substrate temperature of about 50° to 55°C when utilized as described above.

When used in a xerographic mode, the above materials are evaporated onto a suitable conductive substrate such as brass, aluminum, stainless steel, conductively coated glass or plastic, etc. The thus formed xerographic plate is then given a uniform electrostatic charge by a corona discharge device in order to sensitize its entire surface. The plate is then exposed to an image of activating electromagnetic radiation, such as light, which selectively dissipates the charge in the illuminated areas of the photoconductor while leaving behind a latent electrostatic image in the non-illuminated areas. This image may be developed and transferred to another material, with development being carried out by depositing finely divided, electroscopic marking particles on the surface of the photoconductive material to make said image visible. It should be pointed out that any suitable method may be used to attain an electrostatic image. Typical techniques are by use of a pin matrix as a print head, pin tubes, etc.

In another embodiment of this invention, it is possible to control the degree of order present. Under certain conditions a second phase of intermediate or long range order and crystalline in nature may be obtained dispersed throughout the vitreous non-crystalline matrix. This result may be achieved by controlling the substrate temperature. For a given substrate temperature, a particular concentration of bismuth in the vitreous matrix will be reached above which crystallinity will appear. To increase the concentration of the metal component in the vitreous matrix without achieving crystallinity the substrate temperature, for example, can be lowered. On the other hand, to achieve greater crystallinity the substrate temperature can be increased.

The uses to which vitreous semiconductors prepared by the process of the instant invention may be employed are as varied as the uses to which semiconductors and semi-insulators have been used in the past. These uses include photoconductors; luminescent materials; electroluminescent materials; switching devices; super-conductors; thermoelectric materials, ferro-electric materials; magnetic materials; electrophotographic photoreceptor and many more.

DESCRIPTION OF SPECIFIC EMBODIMENTS

The following examples further specifically define the present invention with respect to the method of making and using vitreous semiconductors. The parts and percentages are by weight unless otherwise indicated. The examples below are intended to illustrate the various preferred embodiments of the invention.

EXAMPLE I

A film containing about 1.5 percent bismuth and 98.5 percent selenium is prepared as follows:

Ten gram samples each of bismuth and selenium are placed into separate quartz crucibles. The crucibles are placed into a vacuum chamber which is evacuated to a vacuum of about $2 \times 10^{-5}$ Torr. A substrate of NESA glass is placed on a water cooled base located about 12 inches above the quartz crucibles and maintained at a temperature of about 54°C. The glass substrate is masked with a thin aluminum plate which is removed from the glass as soon as the bismuth and selenium crucibles reach their evaporation temperature. The bismuth and selenium are evaporated onto the substrate by maintaining the above-described conditions for about 2½ hours after which time the heating is terminated. The vacuum chamber is cooled to room temperature, the vacuum broken, and the film coated NESA plate removed from the chamber. No crystallinity is observed in the film when examined by X-ray diffraction.

The resulting vitreous film is then used as a xerographic infrared sensitive photoreceptor by subjecting the plate to the steps of charging, exposing and developing. To accomplish this, the plate is corona charged to a positive potential of about 300 volts, and then exposed to a 100 watt tungsten light source at a distance of about 16 inches for about 2 seconds to form a latent electrostatic image on the surface of the plate. The latent image is then developed by cascading an electrostatic marking material across the surface containing said image. The image is transformed to a sheet of paper and heat fused to make it permanent. Good quality copries of an original are obtained by this method. Successful images are made using filters which cut out all visible light and transmit only radiation of wavelength greater than 8,200A.

EXAMPLE II

A 17.1 micron amorphous film containing about 3 percent bismuth and 97 percent selenium is prepared by the method as set forth in Example I. The crucible containing the bismuth is maintained at a temperature of about 665°C while the crucible containing the selenium is maintained at a temperature of about 326°C. The substrate is maintained at about 52°C.

EXAMPLE III

A 62 micron amorphous film containing about 4.5 percent bismuth and 95.5 percent selenium is prepared by a modified form of the method as set forth in Example I. The bismuth is evaporated from a Knusden source held at a temperature of about 756°C while the crucible containing the selenium is maintained at a temperature of about 239°C. The substrate is held at a temperature of about 52°C.

EXAMPLE IV

A 25 micron amorphous film containing about 6.4 percent bismuth and 93.6 percent selenium is prepared by the method as set forth in Example I. The bismuth source is held at about 680°C while the selenium source is held at about 290°C.

The films prepared in Examples II and III have resistivities on the order of $10^{12}$ to $10^{10}$ ohm/centimeter, the resistivities decreasing with increasing bismuth percentages. As these films are sensitive to near (on the order of about 1 micron) infrared radiation, this combination of properties makes the materials suitable for near infrared sensitive xerographic photoreceptors.

EXAMPLE V

A 12 micron amorphous film containing about 25 percent bismuth and about 75 percent selenium is prepared by the method as set forth in Example I. The bismuth source is held at about 744°C while the selenium source is maintained at about 242°C.

EXAMPLE VI

A 16 micron amorphous film containing about 30 percent bismuth and about 70 percent selenium is prepared by the method as set forth in Example I. The bismuth source is held at about 719°C while the selenium source is held at 250°C. This film is found to have a resistivity on the order of $10^8$ ohm-centimeters and represents the approximate maximum photosensitivity for the vitreous bismuth-selenium semiconductors deposited on substrates held at about 50° to 55°C. While the resistivity of this material is on the low side for xerographic applications, the photosensitivity characteristics of this material make it exceptionally useful for near-infrared photodetection apparatus.

EXAMPLE VII

A 13 micron amorphous film containing about 33 percent bismuth and about 67 percent selenium is prepared by the method as set forth in Example I. The bismuth source is held at about 726°C while the selenium source is held at a temperature of about 258°C. The substrate is held at about 55°C.

EXAMPLE VIII

A 32 micron amorphous film containing about 36 percent bismuth and about 64 percent selenium is prepared by a method as set forth in Example I. The bismuth source is held at about 790°C while the selenium source is held at about 242°C. The substrate is held at about 53°C.

Although specific components and proportions have been stated in the above description of the specific embodiments of this invention, other suitable materials and procedures may be used with similar results. In addition, other materials may be added with synergize, enhance or otherwise modify the properties of the semiconductors.

EXAMPLE IX

Evaporations of selenium, bismuth/selenium and cadmium/selenium were carried out in a bell-jar system at a pressure of about $10^{-6}$ Torr. The vapors, which were obtained from evaporation of separate sources when a metal and selenium were used, were condensed together on tin-oxide coated substrates at a temperature of 52°±1°C. When a metal was co-evaporated with the selenium, a shuttering arrangement was used which permitted deposition to occur only after the desired constant evaporation rates had been established for the two components.

In the metal/selenium systems, the composition of all deposited films was checked by X-ray fluorescent analysis. The films were dissolved in concentrated $HNO_3$ and compared with standard metal/selenium solutions prepared in an identical fashion.

The photoresponse of the films was determined by exposing an electrostatically charged surface of the photoinsulator to monochromatic light of known intensity.

Upon exposure, photoexcited electrons and holes move accross the film in the direction of the applied field and produce a decrease in surface potential which is measured by an electrometer. The initial rate of voltage decay was converted into units of current and the quantum gain calculated from the relationship:

$$[G = \Delta I/Fe]$$

where $\Delta I$ = photocurrent which is calculated from the xerographic discharge curve obtained by measuring voltage as a function of time, F = photon flux obtained by measuring the light intensity and $e$ is the electron charge. Unity quantum gain would be achieved if each incident photon resulted in a hole electron pair collected at the electrodes.

The wavelength dependency of quantum gain for selenium, bismuth/selenium and cadmium/selenium is illustrated by the drawing. Since the film could not be charged to sufficiently high fields to collect all the photogenerated carriers and hence attain saturation of photocurrent, they were charged to a constant field of $2 \times 10^5$ v/cm with the surface potential positive. Quantum gain is thus a measure of carrier collection efficiency at this field as well as generation efficiency. As can be determined from the drawing, the quantum gain curve for each of the films tested is displaced to longer wavelengths than that of vitreous selenium.

It can also be determined from the drawing that the curve obtained for a vitreous Bi/Se coating containing 0.5% Bi is considerably further displaced than is the curve obtained for the composition containing 14% cadmium. Thus a vitreous semiconductor comprising Bi/Se is superior to one comprising Cd/Se since the former composition will experience a quantum gain upon exposure to light of a longer wavelength than will the latter even with a considerably smaller amount of metallic impurity in the Bi/Se system.

Photoresponse to light of longer wavelength is especially desirable when one is attempting to prepare a xerographic copy of an original which consists of black figures on a pink or light red background. The semiconductor prepared by the process of the instant invention would be discharged by the reflected light thereby forming a latent image while Cd/Se or Se would not be discharged and would therefore not acquire a latent image upon exposure to the article to be copied.

The use of bismuth to extend the photoresponse of selenium is also desirable due to the fact that bismuth does not reduce the thermal stability of selenium and the amount of bismuth necessary to effect the sensitivity of selenium to longer wavelengths is so small so as not to reduce the mechanical flexability of the selenium.

Other modifications and ramifications of the present invention would appear to those skilled in the art upon reading the disclosure. These are intended to be included within the scope of this invention.

What is claimed is:

1. A method for forming a vitreous semiconductor responsive to radiation in the red and infrared region which comprises:

a. simultaneously heating nonstoichiometric amounts of bismuth and selenium under vacuum conditions to form vapors of both components, and b. simultaneously vapor quenching the bismuth and selenium vapors onto a cold substrate maintained at a temperature below the condensation point of either component, thereby forming a vitreous semiconductor film on said substrate, said method being further defined in that the heating step is carried out in a manner such that the vitreous semiconductor formed contains at least about 0.5 atomic percent bismuth and a stoichiometric excess of selenium.

2. The method of claim 1 wherein a vitreous semiconductor having from about 11 to about 16 atomic percent bismuth is formed.

3. The method of claim 2 wherein a vitreous semiconductor having from about 0.5 to 3 atomic percent bismuth is formed.

4. The method of claim 1 wherein the pressure is from $2 \times 10^{-5}$ to $2 \times 10^{-8}$ Torr.

5. The method of claim 1 wherein the substrate is maintained at a temperature of from 50°C to 55°C.

6. The method of claim 1 wherein the substrate is brass, aluminum, stainless steel or a conductively coated glass.

7. The method of claim 1 wherein the substrate is quartz, glass, mica or polyethylene.

8. The method of claim 1 wherein the heating step is carried out so that the vitreous semiconductor formed contains from about 0.5 to 3 atomic percent bismuth.

* * * * *